United States Patent Office 3,122,697
Patented Feb. 25, 1964

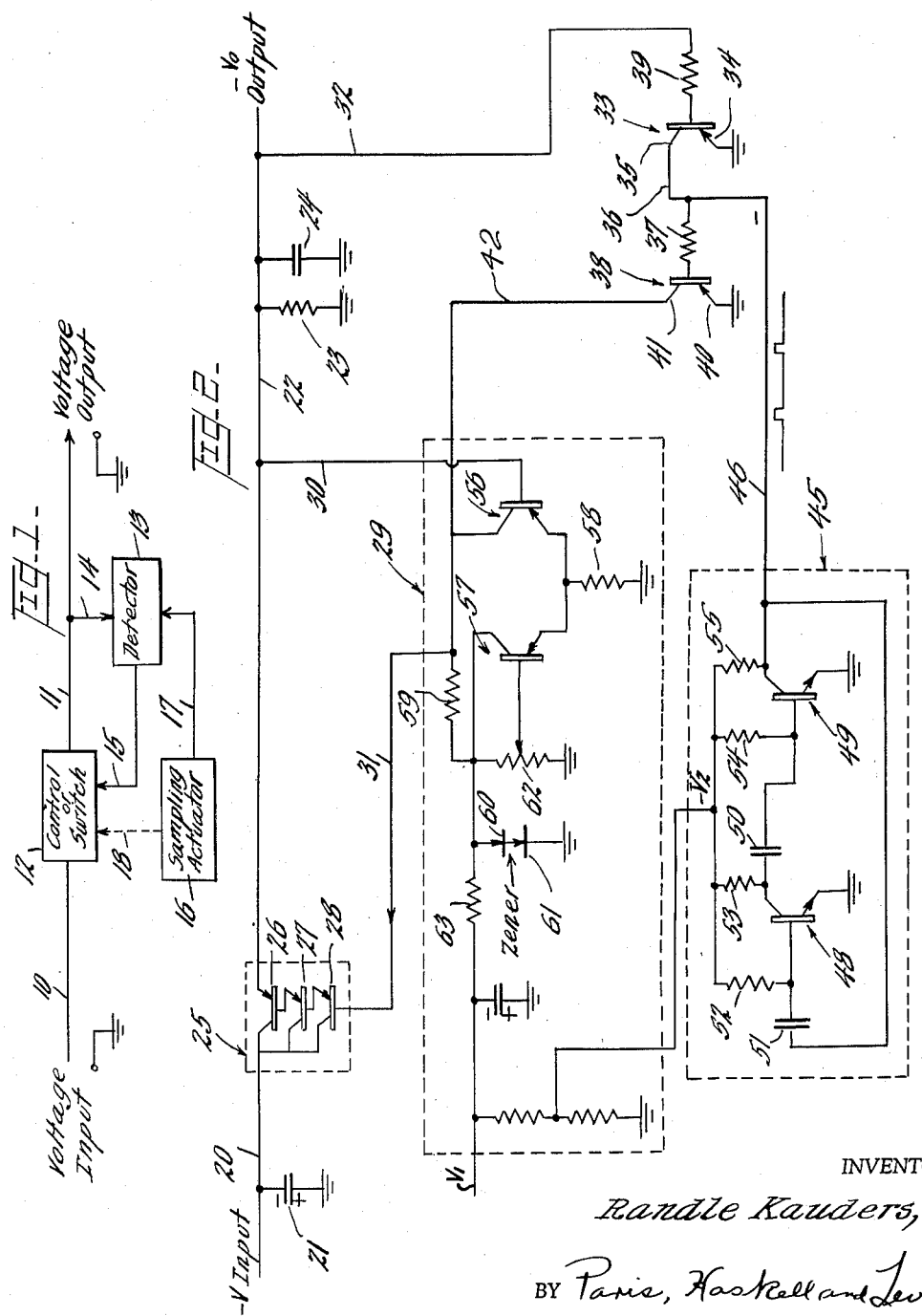

3,122,697
SHORT CIRCUIT PROTECTIVE DEVICE
Randle Kauders, Philadelphia, Pa., assignor to Vector Manufacturing Company, a corporation of Pennsylvania
Filed July 20, 1960, Ser. No. 44,181
11 Claims. (Cl. 323—22)

The invention generally relates to electrical protective devices and systems, and more particularly to devices and systems for automatically disconnecting electrical power upon the occurrence of a fault such as a short circuit, and automatically restoring the electrical power when the fault has been removed or otherwise corrected.

In most electrical systems, whether for high or low power application, the occurrence of short circuits and like faults are generally dangerous and destructive to the system and its surroundings due to the excessive current flow that greatly exceeds the designed capability of the system and its components. For this reason it has become customary to employ various types of protective devices and systems such as meltable fuses, circuit breakers, and the like that respond to unusual current or voltage conditions in the system, indicating that a fault exists, to rapidly disconnect the power from the system before such destructive effects may occur.

The present invention is directed to this general class of protective devices and, in addition, is concerned with the problem of automatically detecting when the fault has been removed or otherwise corrected and thereupon automatically restoring the power to the system without the need for manually resetting the device or mechanism such as resetting of a circuit breaker or the like, or replacing a melted fuse element with a new fuse element.

Generally, according to the invention, these functions are performed by providing a control or switch means that is actuable to connect or disconnect the power in a system in combination with a detector or sensing means that determines when the fault exists to rapidly actuate the switch means and disconnect the power. To restore the power in the system upon the removal or otherwise correction of the fault, there is additionally provided what may be termed a sampling actuator means that periodically operates the switch means to reconnect the power for a relatively short period of time that is insufficient to injure the system and components. In the event that the fault has persisted and still exists at the time of such sampling, the power is again disconnected after the sampling interval and the system remains de-energized until the next succeeding test by the sampling means. On the other hand, should the fault have been corrected by the time of such sampling, the power is automatically restored to the system and the protective means is reset and readied for operation should a new fault occur.

It is, accordingly, a principal object of the invention to provide an automatically resetting protective means for electrical systems.

A further object is to provide such a means of minimum size, weight, and cost, compatible with the electrical power being controlled, and being of reduced complexity.

Another object is to provide such a means that may be employed in low or high power electrical systems.

Still another object is to provide such a protective device that is fast acting in both disconnecting electrical power from a faulty system and fast acting in automatically restoring power after the faulty condition being removed or otherwise corrected.

Other objects and many additional advantages will be more readily comprehended by those skilled in the art after a detailed consideration of the following specification, taken with the accompanying drawing wherein:

FIG. 1 is a block diagram representation of a protective system, according to the present invention, and FIG. 2 is an electrical schematic diagram of a regulated power supply circuit embodying one preferred circuit form of the protective system according to the invention.

Referring now to FIG. 1, there is shown in block diagram form the various elements forming a protective system to control the application of power from a voltage or power input line 10 to a voltage or power output line 11, according to whether or not a fault or short circuit occurs at output 11. As shown, the system generally comprises a control or switch means 12 connected intermediate the input and output lines 10 and 11, respectively, and being operable to either connect or disconnect the input and the output. The control or switch means 12 is actuated by a detector 13 that senses or detects the voltage or current condition on the output line 11 over line 14 to determine when a short circuit or other fault occurs. Upon finding such a condition to exist, the detector 13 actuates the control or switch 12 over line 15 to disconnect the circuit between the input line 10 and output line 11, thereby removing power from the output line and preventing injury to the system or its environs. Since the detector means 13 responds only to the condition on the output line 11, it is normally incapable of resetting the system once the short circuit has been corrected, since the output line 11 is disconnected from the input or power line 10 and no voltage or current is present on output line 11 whether or not the short circuit is still present or has been removed.

For determining when the fault has been removed and enabling the automatic resetting of the system, there is provided what may be termed a sampling actuator 16 operating in combination with the detector 13 and the control means 12. The sampling actuator operates over line 17 and through the detector 13, or alternately, over line 18 (shown dotted) directly to the control 12 to repetitively actuate the control or switch 12, thereby to connect power from line 10 to output line 11 for short periods of time that are insufficient in time to injure the system even if the short circuit or fault still exists. In the event that the short circuit has been removed, the actuation of the control or switch 12 by the sampling actuator, serving to apply power to the output line 11 results in the correct current-voltage condition on the output line 11, whereupon the detector responds to the correct signal on the output line to enable the control or switch 12 to remain closed and continue supplying power to the output line 11, effecting resetting the protective system. If, on the other hand, the fault or short circuit at the output line 11 persists during the short interval operation of the sampling actuator 16, the voltage and current conditions produced on the output line during the sampled interval remain in error and the detector 13, sensing this error condition, does not enable the control or switch to remain closed and the power is again removed from the output line 11 after the sampled interval.

The sampling actuator preferably includes a timing device providing a relatively long time period between successive actuations of the control or suitable means 12. In this manner any excessive current flowing through short circuited output line 11 occurs for only a short interval of time with a relatively long time period between successive sampling impulses, thereby preventing injury or overheating of the electrical system. For example, in one embodiment, the sampling actuator may be a rather high frequency repetitive pulse generator producing short time duration impulses and with the time interval occurring between succeeding pulses being about nine times greater than the width of each pulse. In this example, power is applied to the output line 11 for only ten percent of the time so that in the event the short circuit persists, the excessive current flow through the system during the sampled intervals is not sufficient to overheat or otherwise damage the system.

Thus, according to the present invention, the automatic resetting means functions to periodically apply power to the circuit or periodically test the circuit for determining if the fault still exists. If the fault has not been corrected, the control or switch means is again opened after each test or sample whereas, if the fault is removed, the switch means 12 remains closed; power is continuously applied to the output line; and the protective system is effectively reset to guard against repetition of the fault or the occurrence of a new fault.

FIG. 2 illustrates one embodiment of the invention in electrical circuit form to protect a regulated direct current power supply against the destructive effects of a short circuit at the output. In this application the regulated power supply is of the low voltage and relatively high current variety for energizing precision electronic equipments used in telemetering communications for aircraft, missiles, and like uses and, accordingly, other protective devices such as fusable elements or available circuit breakers are unsatisfactory in requiring normal replacement of the fuse or manual reset of the circuit breakers as well as other known disadvantages in weight and size.

Referring to FIG. 2, the regulated power supply includes an input line 20 and filter capacitor 21 for receiving a low voltage relatively unregulated supply, and a variable impedance or control means 25 (indicated within the dotted enclosure), in series between this input and an output line 22 for controlling the voltage and current at the output line 22. A detector circuit included within the dotted line enclosure designated 29, is energized over line 30 by the potential on output line 22 to provide a signal over line 31 leading to the variable control means 25 and serving to regulate the current flow through control 25 and maintain constant the potential on output line 22. In operation, if the potential at output line 22 tends to increase, the signal over line 30 is correspondingly increased and the resulting voltage over line 31 from the detector 29 is decreased to reduce the current flow through control means 25, thereby decreasing the potential on output line 22 and restoring it to its predetermined regulated value. On the other hand, should the potential on output line 22 tend to fall, a reduced voltage is transmitted over line 30 to the detector 29 and the potential on line 31 from the detector 29 is increased permitting more current to flow from input 20 and through control means 25 to the output line 22, thereby to increase the potential at output line 22 to its predetermined regulated value. As thus far described, however, should a short circuit occur on output line 22, the potential thereon would fall to a low value resulting in the detector means 29 and control means 25 attempting to restore the potential by increasing the current through control 25, thereby subjecting the power supply component and input unregulated source (not shown) to an injurious flow of current.

To protect the system against such short circuits, there is provided in this embodiment, a second feedback line 32 connected to the output line 22 and energizing the base element of a transistor 33, whose emitter element 34 is grounded and whose collector element 35 is connected over line 36 and through resistor 37 to the base of a second transistor 38. The second transistor 38 is provided with an emitter element 40 that is grounded and a collector element 41 that is connected over line 42 to the detector line 31 leading to control means 25. In the event of a short circuit on output line 22, a greatly reduced voltage is produced on line 22 and, in turn, transmitted over line 32, which low voltage is sufficient to cut off conduction of transistor 33, thereby increasing the potential at the collector element 35 thereof. The increased potential at the collector 35 is transmitted to the base element of the second transmitter 38 rendering the second transmitter conducting from emitter to collector elements thereof and bringing the potential of line 42 (connected to collector 41) to ground potential. Transistors 33 and 38 thus operate substantially as switches that respond in cascade to a short circuit on output line 22 to bring the potential on line 42 to ground. Line 42 is, in turn, connected to line 31 that energizes the control 25, whereby the control 25 is energized in such manner as to effectively disconnect the input line 20 from the output line 22 and remove power from the output. Thus, upon the occurrence of a short circuit at the output 22, the control 25 is energized to disconnect the power from the output line 22 preventing the flow of an excessive current through the power supply.

Once the power has been disconnected from output line 22, as described above, the removal of the short circuit will not function to again restore power, since output line 22 is at ground potential and, accordingly, feedback lines 30 and 32 remain at ground potential whether or not the short circuit or other fault is removed.

For automatically re-establishing power on output line 22 after the short circuit is removed, there is provided a sampling means for periodically energizing control 25 to apply power on output line 22. Such means, according to the embodiment of FIG. 2, comprises a free running multivibrator circuit, indicated within dotted enclosure designated 45, that produces a series of time spaced pulses of short duration over line 46 that are directed to the base element of transistor 38. As will be recalled from the above, after the occurrence of a short circuit, transistor 33 is made non-conducting and transistor 38 is made conducting, thereby to ground line 31 and effectively render control means 25 non-conducting. Therefore, each of the time spaced pulses from free running multivibrator 45 are of such polarity as to render transistor 38 non-conducting during the sampling interval of the pulse. As transistor 38 is periodically made non-conducting, the potential on line 31 is raised during the short interval of each sampling pulse to permit current flow through control 25 and over output line 22. In the event that the short circuit on line 22 has been removed, the brief admission of power to the output line 22 raises the potential on line 22, whereupon the increased potential is detected over feedback line 32 to render transistor 33 in a conducting condition and transistor 38 in a non-conducting condition thereby to re-establish power on output line 22 and effectively reset the protective means. Alternatively, if the short circuit has not been removed, the brief admission of power to output line 22 does not enable the potential on that line to increase and after the brief sampling pulse from multivibrator 45 has expired, the output line 22 is again de-energized since transistor 33 is again made non-conducting and transistor 38 is again made conducting to ground line 31.

The free running multivibrator 45 operates continuously to repetitively sample or test the circuit by briefly enabling power to be applied to the output line 22 at fixed and regularly time-spaced intervals until the removal of the short circuit condition, whereupon the power is continuously applied to output 22 and the protective system is reset, as described above. Thus, according to the invention, there is provided means for automatically resetting the protective system once the fault or short circuit is removed.

Despite the fact that power is being periodically applied to the output 22 while a short circuit may still exist, thereby creating current surges through the system, the sampling intervals may be made extremely short in comparison to the time interval between samples. By proper design, therefore, overheating of the system or other injury to the components is avoided.

In one example, the sampling pulse was made very short and the time interval between pulses was about nine (9) times greater. Under this condition, the circuit was energized for only about ten percent of the time and the heating of various elements in the circuit was found to be less than during normal operation.

Returning to FIG. 2 for a detailed consideration of the control circuit 25, the detector 29, and the free running multivibrator 45; the multivibrator 45 preferably comprises a pair of transistors 48 and 49 in back-to-back feedback relation with the collector element of transistor 48 being coupled to the base element of transistor 49 in feedback through capacitor 50 and with the collector of transistor 49, in turn, being connected in feedback through capacitor 51 to the base of transistor 48. The base elements and collector elements of both transistors are energized by a source of voltage (not shown) through resistors 52, 53, 54, and 55. By suitably adjusting the feedback time constants of this circuit, the frequency of the multivibrator is adjusted as desired as well as the pulse duration of the sampling pulse.

The control circuit 25, as shown, is comprised of three concatenated transistors 26, 27, and 28 with the collector elements of each in parallel to the input line 20. The emitter element of transistor 28 is connected to the base of transistor 27 and the emitter of transistor 27 is connected to the base of transistor 26, which, in turn, has its emitter directly connected to output line 22. The upper transistor 26 is, therefore, in series between the input and output lines 20 and 22 and functions as a variable impedance or valve to regulate the flow of current from input to output according to the signal on line 31. The remaining two transistors 27 and 28 are for the purpose of coupling the signal on line 31 to the base of transistor 26, while impedance isolating the detector circuit 29 from the control circuit 25.

The detector circuit 29 includes a pair of transistors 56 and 57 in a comparator arrangement with their emitter elements commonly connected to a self-biasing resistor 58. The base of transistor 56 is energized by the follow-up detector signal over line 30 and the collector element of transistor 56 is energized by a voltage supply through resistor 59 and is also connected to line 31 to provide the signal energizing the control circuit 25. The voltage source energizing resistor 59 and transistor 56 is stabilized by means of a parallel circuit including, in a first leg, two series-connected diodes 60 and 61, operating in the Zener region, and including, in a second leg a variable potentiometer 62; and including, in the third leg, the transistor 57 in series with biasing resistor 58. The base element of transistor 57 is connected to the movable tap of resistor 62, whereby an increase in potential across potentiometer 62 increases the current flow through transistor 57 and causes an increased voltage drop across a series resistor 63 feeding these components, thereby to stabilize the potential feeding resistor 59, as desired.

Although but one preferred circuit embodiment of the invention has been illustrated and described, it is believed evident that many changes and variations may be made by those skilled in the art without departing from the spirit and scope of the invention. Consequently, this invention should be considered as being limited only by the following claims.

What is claimed is:

1. An automatically resetting short circuit protective system comprising a controller for controlling the application of power to an output line, a voltage magnitude detector responsive to the potential on the output line falling below a given level responsively to a short circuit condition on the output line for actuating the controller to disconnect power from the output line, and means for repetitively energizing the controller to apply power to said output line for brief time intervals whereby upon correction of the short circuit condition the potential on the output line rises above said given level during the next brief interval of application of power thereto enabling said detector and controller to re-establish power on said output line.

2. An automatically resetting protective system for electrical systems comprising a switch means for controlling the application of power to an output line, transistor detectors for sensing the voltage on the output line and actuating said switch means to disconnect the power upon the voltage on the output line falling below a given level, and an asymmetrical oscillator periodically energizing said transistor detectors to briefly actuate said switch means to apply power to said output line whereby in the event that the voltage level on the output lines is restored to its original level during said brief actuation, said transistor detectors energize said switch means to continuously apply power thereto whereas if the voltage level at the output line is not so restored, said switch means is again actuated to disconnect the power after each brief actuation.

3. In the system of claim 2, said switch means including a transistor in series connection with said output line, and said transistor detectors controlling the current conduction through said switch transistor.

4. In the system of claim 3, said oscillator comprising an asymmetrical free running transistor oscillator.

5. An automatically resetting electronic regulator for electrical systems comprising a regulating electron valve for controlling the application of power to an output line, a follow-up circuit including a detector electron valve for sensing the potential level on the output line and controlling the regulating valve to disconnect the power when the potential level drops below a predetermined voltage, and resetting means including an asymmetrical oscillator for repetitively energizing said regulating electron valve for briefly applying power to said output line whereby upon restoration of the potential on the output line above said predetermined voltage, said follow-up circuit energizes said regulating electron valve to continuously apply power to said output line.

6. In the system of claim 5, said oscillator being connected to repetitively energize said detector electron valve.

7. In the system of claim 6, the addition of a voltage regulating means for detecting any variation in potential on the output line for energizing said regulating electron valve to varying the degree of electrical power to the output line, said regulating means being subservient to the follow-up circuit when the potential on the output falls below a predetermined voltage.

8. In the system of claim 7, said follow-up circuit rendering said regulating means inoperative when the potential on the output line falls below a predetermined voltage.

9. In a voltage regulating and automatically resetting short circuit protection system, a controller for regulating the application of power to an output line, a first feedback control circuit responsive to the amplitude of voltage on the output line for energizing said regulator in a direction to maintain the potential on the output line constant, a second feedback control circuit responsive to the amplitude of voltage on the output line for actuating the regulator to disconnect power from the output line upon the amplitude of voltage on the output line being lower than a predetermined level, an asymmetrical free running multivibrator circuit included in said second feedback control circuit for repetitively applying enabling impulses to said regulator for brief time intervals after the controller has disconnected power from the output line whereby power is briefly and repetitively applied to said output line, whereupon in the event that the amplitude of potential on said output line is above said predetermined level, said second feedback control circuit is energized to re-establish power on said output line.

10. In a voltage regulating and short circuit protection circuit, transistor regulator means for the application of power to an output line, a voltage stabilized potential source comprising a series connected resistor and Zener diode energizable by an unregulated source, a variable potentiometer for selecting an adjustable portion of said stabilized potential source, a pair of transistors interconnected as a differential amplifier with one of said transistors being energized by the selected portion of the stabilized source and the other being energized by the potential on the output line, and means connecting said differential amplifier to energize said transistor regulator, a short circuit protection circuit comprising a normally conducting transistor switch energized by a given level of potential on the output line, a free running asymmetrical multivibrator normally biased into nonoperating condition by said conducting transistor, means interconnecting said normally conducting transistor, said differential amplifier and said transistor regulator means to disconnect power from said output line upon said normally conducting transistor being energized by said output line into nonconductive condition, means interconnecting said normally conducting transistor and said multivibrator to permit oscillation of said multivibrator upon said normally conducting transistor being rendered nonconducting, and said interconnecting means between said normally conducting transistor and said transistor regulator means conveying alternate oscillator impulses from said oscillating multivibrator to said transistor controller to successively apply power to said output line for brief time intervals.

11. In a voltage regulating circuit for controlling and stabilizing the power directed to an output line from a variable source of power, transistor controller means being energizable to control the flow of power from said source to said line, a short circuit and fault protection means responsive to the potential on said output line for energizing said controller to deenergize said output line upon the potential at said output line being below a given level, said short circuit protection means comprising a transistor switch means energizable by said output line to abruptly change its condition of conduction, and means responsive to said abrupt change for actuating said controller to disconnect power from output line, a free running multivibrator being normally biased into inoperative condition by said transistor switch means, and being biased into operative free running condition by said abrupt change of said transistor switch means for repetitively energizing the controller to briefly apply power to said output line at successive intervals, whereby upon restoration of said short circuit or fault, said controller is energized to re-establish continuous power on said output line.

References Cited in the file of this patent
UNITED STATES PATENTS

| | | |
|---|---|---|
| 2,915,693 | Harrison | Dec. 1, 1959 |
| 2,942,174 | Harrison | June 21, 1960 |
| 2,981,884 | Tighe | Apr. 25, 1961 |